(12) United States Patent
Chang et al.

(10) Patent No.: US 8,254,664 B2
(45) Date of Patent: Aug. 28, 2012

(54) SYSTEM AND METHOD FOR MEASURING ERRORS OF WORKPIECES

(75) Inventors: Chih-Kuang Chang, Taipei Hsien (TW); Xin-Yuan Wu, Shenzhen (CN); Hua Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 470 days.

(21) Appl. No.: 12/582,819

(22) Filed: Oct. 21, 2009

(65) Prior Publication Data

US 2010/0278418 A1 Nov. 4, 2010

(30) Foreign Application Priority Data

Apr. 29, 2009 (CN) .......................... 2009 1 0301971

(51) Int. Cl.
*G06K 9/00* (2006.01)

(52) U.S. Cl. ...................................... 382/152; 382/141

(58) Field of Classification Search .................. 382/100, 382/181, 190, 195, 199, 203, 206, 141–152, 382/285; 345/419, 418
See application file for complete search history.

(56) References Cited

U.S. PATENT DOCUMENTS

| | | |
|---|---|---|
| 2004/0051711 A1 | 3/2004 | Dimsdale et al. |
| 2005/0168460 A1* | 8/2005 | Razdan et al. ................. 345/419 |
| 2006/0285758 A1* | 12/2006 | Marugame ..................... 382/236 |

* cited by examiner

*Primary Examiner* — Tri T Ton
(74) *Attorney, Agent, or Firm* — Altis Law Group, Inc.

(57) ABSTRACT

A method for measuring errors of workpieces by comparing a three-dimensional model and the workpieces manufactured according to the three-dimensional model is provided. The method converts a point cloud of each workpiece to a measured triangular mesh model, and aligns each measured triangular mesh model to the three-dimensional model. The method further compares each measured triangular mesh model with the three-dimensional model to check for differences between two model so as to obtain errors of each workpiece, and generates one or more analysis reports according to the errors of each workpiece.

12 Claims, 6 Drawing Sheets

SYSTEM AND METHOD FOR MEASURING ERRORS OF WORKPIECES

BACKGROUND

1. Technical Field

Embodiments of the present disclosure generally relate to errors analyzing systems and methods, and more particularly to a system and method for measuring errors of workpieces.

2. Description of Related Art

Generally, before manufacturing workpieces, a three-dimensional model of the workpieces is first drawn using the computer-aided design (CAD) technique. The workpieces are then manufactured according to the three-dimensional model.

However, due to manufacturing factors, the manufactured workpieces may not be exactly the same as the three-dimensional model due to errors therein. What is needed, therefore, is a system and method for measuring the manufactured workpieces so as to determine precisions of the manufactured workpieces.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
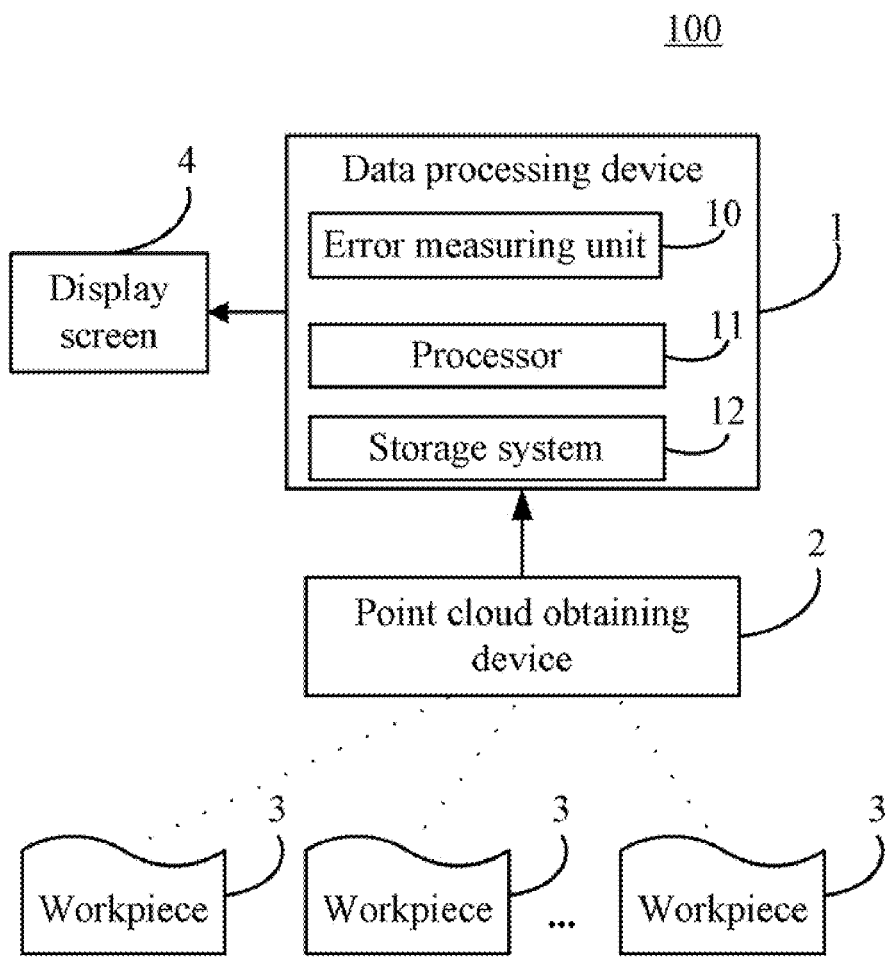
FIG. 1 is a block diagram of one embodiment of a system for measuring errors of workpieces.

FIG. 1 is a block diagram of one embodiment of a system 100 for measuring errors of a plurality of workpieces 3. In one embodiment, the workpieces 3 are manufactured according to a three-dimensional model. In one embodiment, the system 100 may include a data processing device 1, and a point cloud obtaining device 2 electronically connected to the data processing device 1. The point cloud obtaining device 2 may be a scanner to scan the surface of each workpiece 3, so as to obtain a point cloud consisting of a large number of points on the surface of each workpiece 3, and output each point cloud as a data file to the data processing device 1. It may be understood that a point cloud is a set of vertices in a three-dimensional coordinate system. These vertices are usually defined by X, Y and Z coordinates. The point cloud represents the visible surface of the workpiece 3 that has been scanned or digitized. The data processing device 1 may be a computer system, such as, a personal computer, an application server, or a notebook computer. In one embodiment, the data processing device 1 includes an error measuring unit 10, a processor 11, and a storage system 12. The storage system 12 stores the point cloud of each workpiece 3 and the three-dimensional model. The error measuring unit 10 includes computer readable program code, which can be executed by the processor 11 to perform a method of measuring errors of the workpieces 3 using the point cloud of each workpiece 3 and the three-dimensional model. The errors of the workpieces 3 can be outputted via a display screen 4 connected to the data processing device 1.

Figure 2:
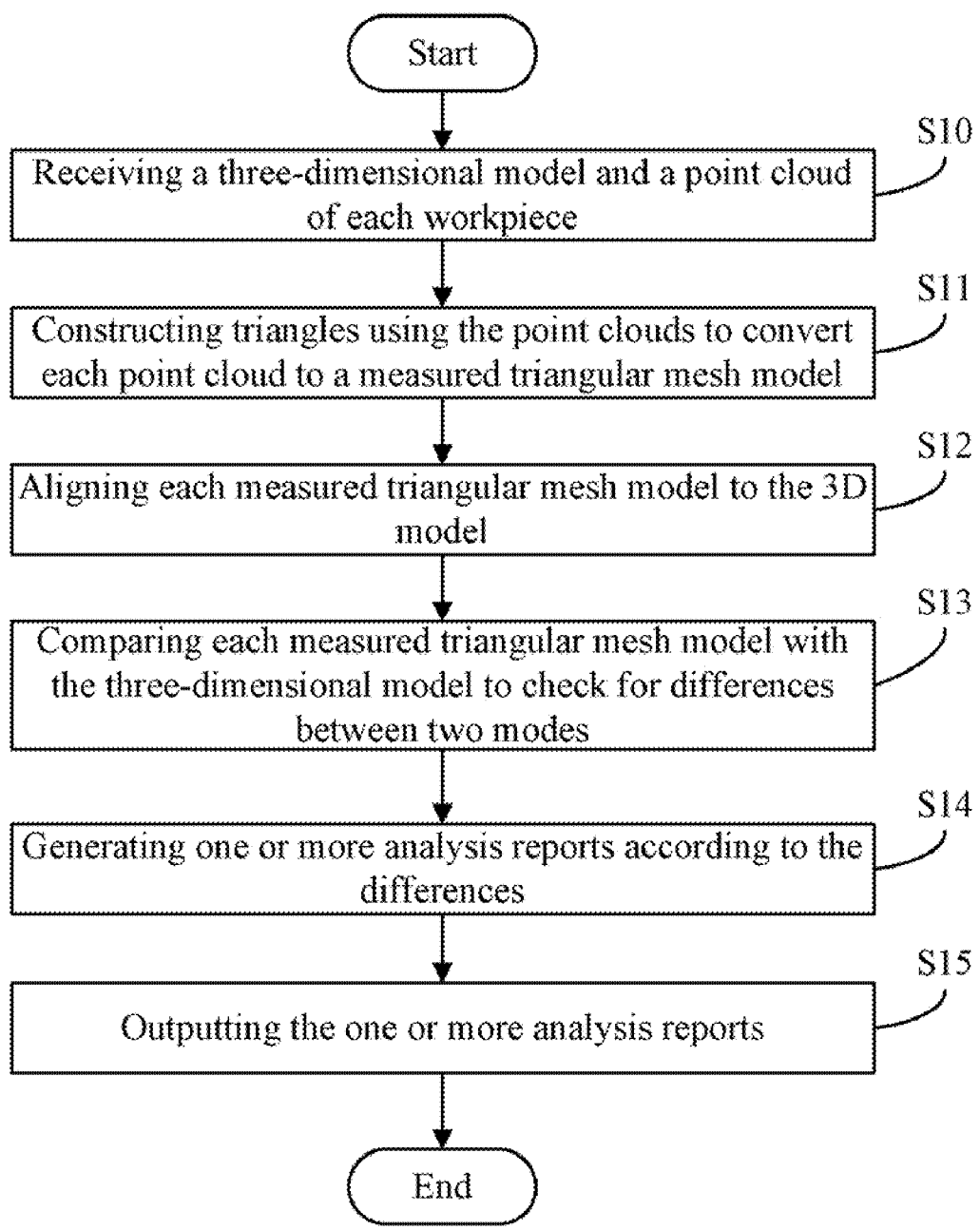
FIG. 2 is a flowchart illustrating one embodiment of a method for measuring errors of workpieces.

FIG. 2 is a flowchart illustrating one embodiment of a method for measuring errors of the workpieces 3. Depending on the embodiment, in FIG. 2, additional blocks may be added, others removed, and the ordering of the blocks may be changed.

In block S10, the error measuring unit 10 receives a three-dimensional model and a point cloud of each workpiece 3 from the storage system 12. As mentioned above, each workpiece 3 is manufactured according to the three-dimensional model. The point cloud of each workpiece 3 is obtained by the point cloud obtaining device 2.

Figure 3:
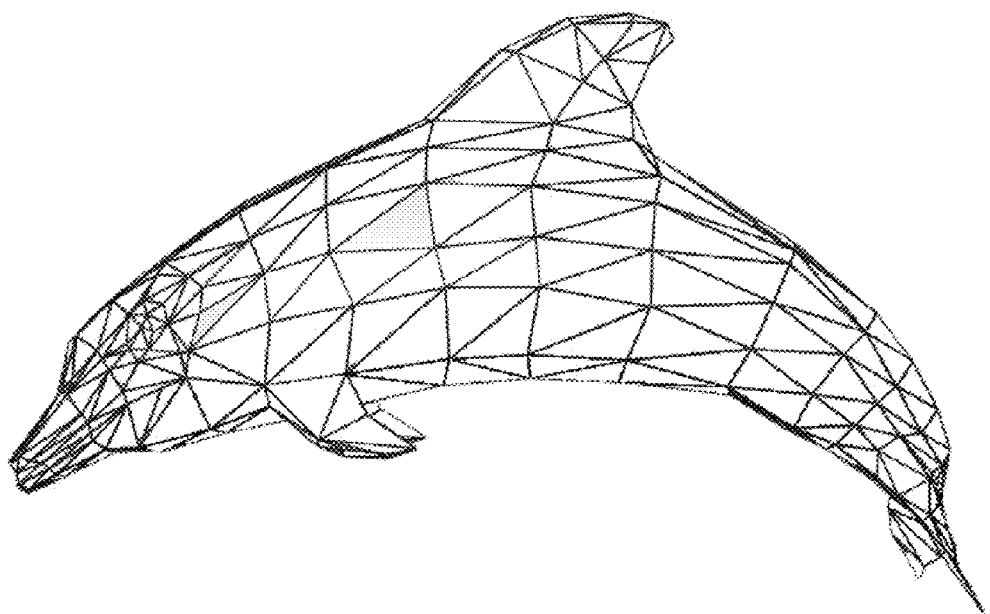
FIG. 3 shows an example of a triangular mesh model.

In block S11, the error measuring unit 10 constructs triangles using the point clouds to convert each point cloud to a measured triangular mesh model, as follows, referring to FIG. 4. It may be understood that a triangular mesh model is a type of polygon mesh in computer graphics. A triangular mesh model comprises a set of triangles (typically in three dimensions) that are connected by each point in the point cloud An example of triangle mesh models representing a dolphin is showed in FIG. 3.

In block S12, the error measuring unit 10 aligns each measured triangular mesh model to the three-dimensional model, as follows, referring to FIG. 5. It may be understood that the alignment is adjustment of the measured triangular mesh model in relation with the three-dimensional model so as to the measured triangular mesh being close to the three-dimensional model as near as possible.

In block S13, the error measuring unit 10 compares each measured triangular mesh model with the three-dimensional model to check for differences between each measured triangular mesh model and the three-dimensional model, as follows, referring to FIG. 6. It may be understood that the differences between a measured triangular mesh model of a workpiece 3 and the three-dimensional model are errors of the workpiece 3.

In block S14, the error measuring unit 10 generates one or more analysis reports according to the errors of the workpieces 3. The analysis reports may analyze errors of the entirety of each single workpiece 3, such as each entire mobile phone casing, analyze errors of a portion of each single workpiece 3, such as a keypad in each mobile phone casing, analyze errors of the entirety of all workpieces 3, such as a plurality of entire mobile phone casings, and/or analyze errors of the same portion of all workpieces 3, such as the keypads in the plurality of mobile phone casings.

In block S15, the error measuring unit 10 outputs the one or more analysis reports to the display screen 4.

Figure 4:
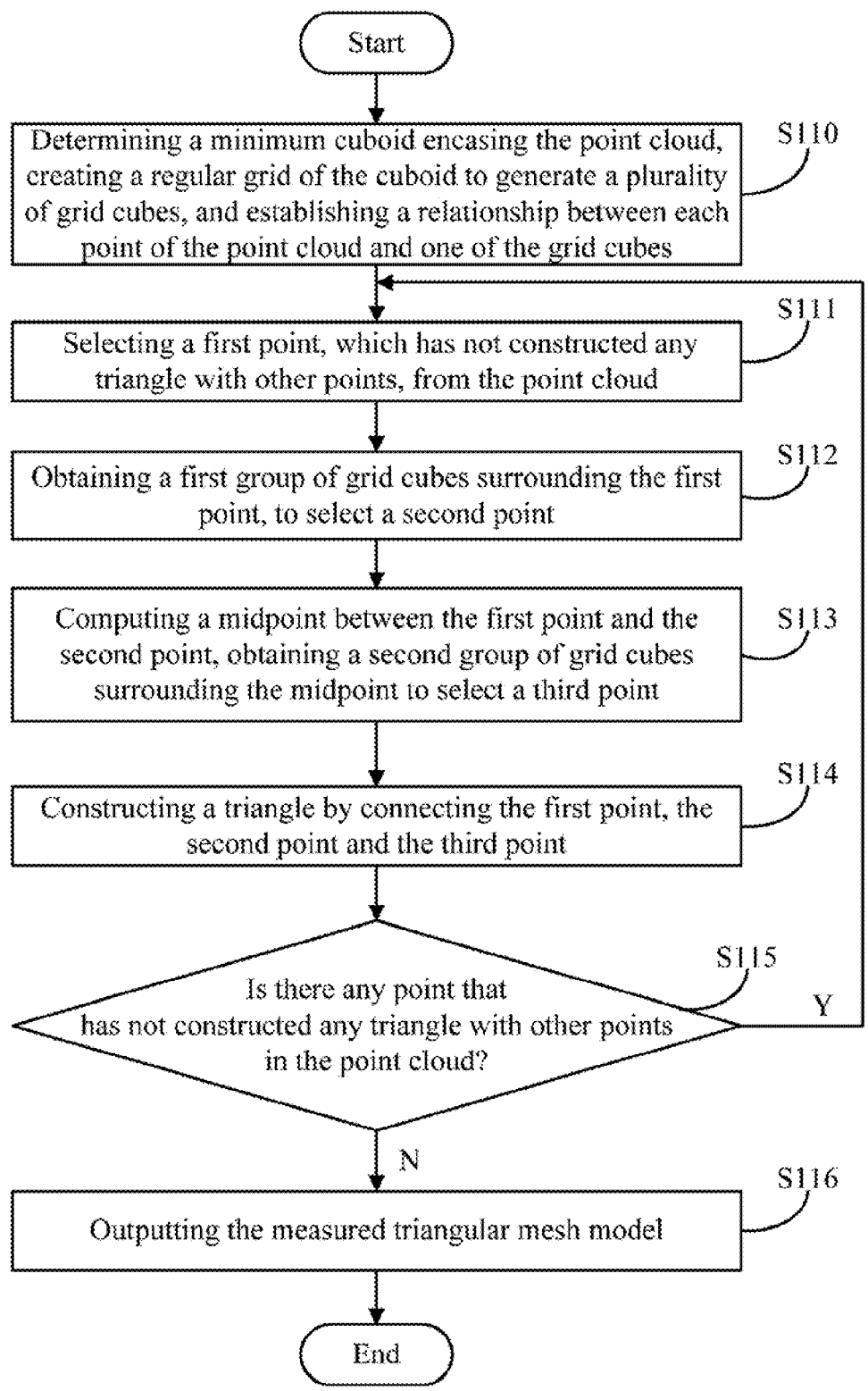
FIG. 4 details block S11 of FIG. 2.

FIG. 4 details block S11 of FIG. 2, namely converting a point cloud to a measured triangular mesh model. Depending on the embodiment, in FIG. 4, additional blocks may be added, others removed, and the ordering of the blocks may be changed.

In block S110, the error measuring unit 10 determines a minimum cuboid encasing the point cloud, creates a regular grid of the cuboid to generate a plurality of grid cubes, and establishes a relationship between each point in the point cloud and one of the grid cubes. It may be understood that the minimum cuboid is a box with the smallest measure (area, volume, or hypervolume in higher dimensions) in which all the points in the point cloud are contained.

In block S111, the error measuring unit 10 selects a first point not constructed any triangle with other points from the point cloud. It may be understood that the first point can be selected randomly.

In block S112, the error measuring unit 10 obtains a first group of grid cubes surrounding the first point, and selects a second point from the first group of grid cubes. In one embodiment, the second point is a nearest point to the first point.

In block S113, the error measuring unit 10 computes a midpoint between the first point and the second points, obtains a second group of grid cubes surrounding the midpoint, and selects a third point from the second group of grid cubes.

In block S114, the error measuring unit 10 constructs a triangle by connecting the first point, the second point, and the third point.

In block S115, the error measuring unit 10 determines that if at least one point, which has not constructed any triangle with other points, exists in the point cloud. Block S111 is repeated if no such point exists in the point cloud. Block S116 is implemented if at least one such point exists in the point cloud.

In block S116, the error measuring unit 10 outputs the measured triangular mesh model.

Figure 5:
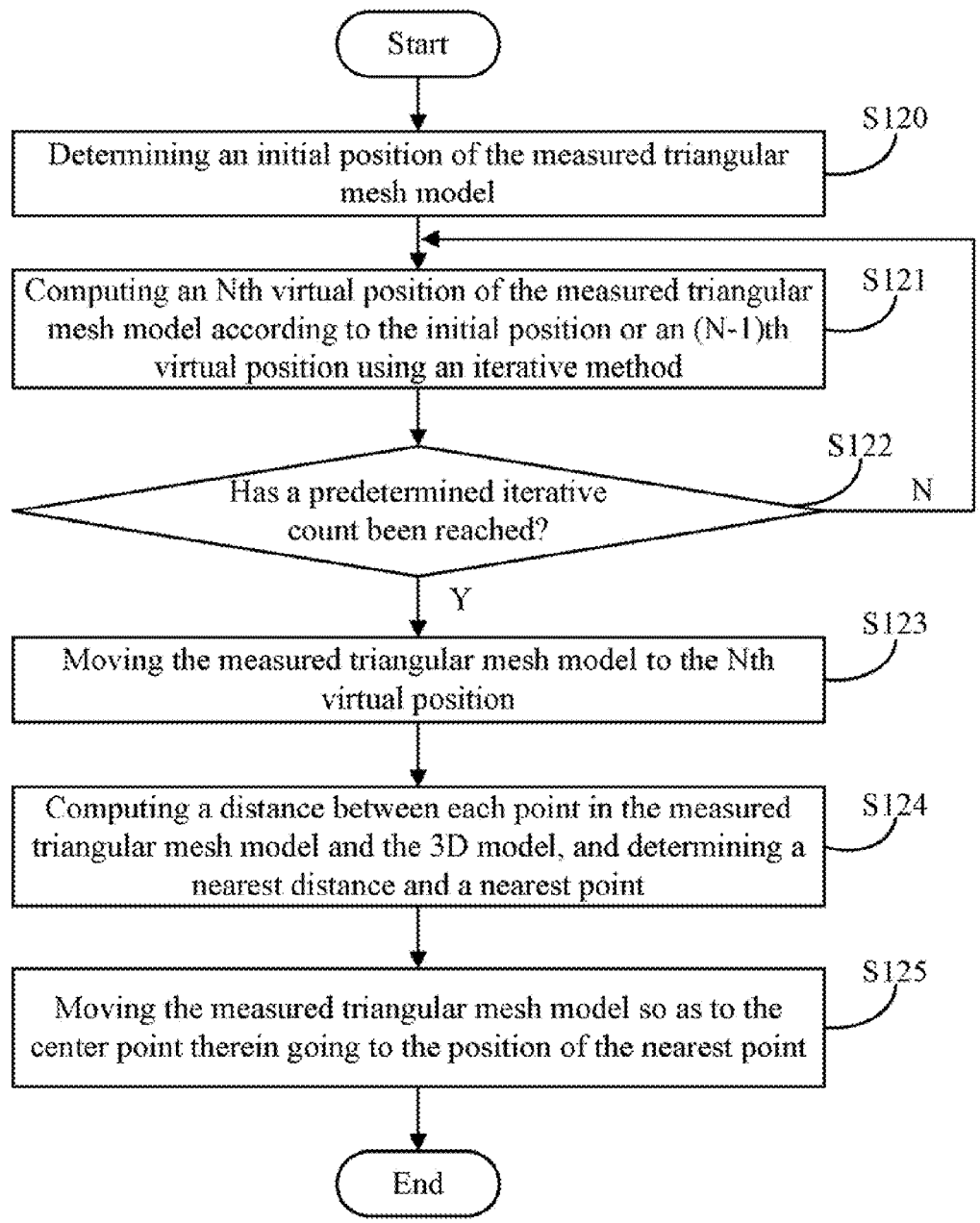
FIG. 5 details block S12 of FIG. 2.

FIG. 5 details block S12 of FIG. 2, namely alignment of the measured triangular mesh model and the three-dimensional model. Depending on the embodiment, in FIG. 5, additional blocks may be added, others removed, and the ordering of the blocks may be changed.

In block S120, the error measuring unit 10 determines an initial position of the measured triangular mesh model. In one embodiment, if the minimum cuboid encasing the measured triangular mesh model overlaps with the minimum cuboid encasing the three-dimensional model, the initial position is the current position of the measured triangular mesh model. In other embodiment, if the minimum cuboid encasing the measured triangular mesh model does not overlap with the minimum cuboid encasing the three-dimensional model, the initial position may be computed using a formula as follows:

$$P=(cenM[x]-cenR[x], cenM[y]-cenR[y], cenM[z]-cenR[z], angleX, angleY, angleZ).$$

In the formula, (cenM[x], cenM[y], cenM[z]) are X, Y, and Z coordinates of the center point "cenM" of the measured triangular mesh model in a three-dimensional coordinate system. (cenR[x], cenR[y], cenR[z]) are X, Y, and Z coordinates of the center point "cenR" of the three-dimensional model in the three-dimensional coordinate system. "angleX" is an angle between a line connecting the center1 point "cenM" with the center point "cenR" and the X axis of the three-dimensional coordinate system. "angleY" is an angle between the line connecting the center point "cenM" with the center point "cenR" and the Y axis of the three-dimensional coordinate system. "angleZ" is an angle between the line connecting the center point "cenM" with the center point "cenR" and the Z axis of the three-dimensional coordinate system.

In block S121, the error measuring unit 10 computes an Nth virtual position of the measured triangular mesh model according to the initial position or an (N−1)th virtual position using an iterative method. In one embodiment, the iterative method is the quasi-Newton method.

In block S122, the error measuring unit 10 determines if a predetermined iterative count has been reached. If the predetermined iterative count has not been reached, block S121 is repeated. If the predetermined iterative count has been reached, block S123 is implemented.

In block S123, the error measuring unit 10 moves the measured triangular mesh model to the Nth virtual position.

In block S124, the error measuring unit 10 computes distances between each point in the measured triangular mesh model and the three-dimensional model, determines a nearest distance and a nearest point corresponding to the nearest distance in the measured triangular mesh model.

In block S125, the error measuring unit 10 moves the measured triangular mesh model so as to the center point therein going to the position of the nearest point. Thus, alignment of the measured triangular mesh model and the three-dimensional model is accomplished.

Figure 6:
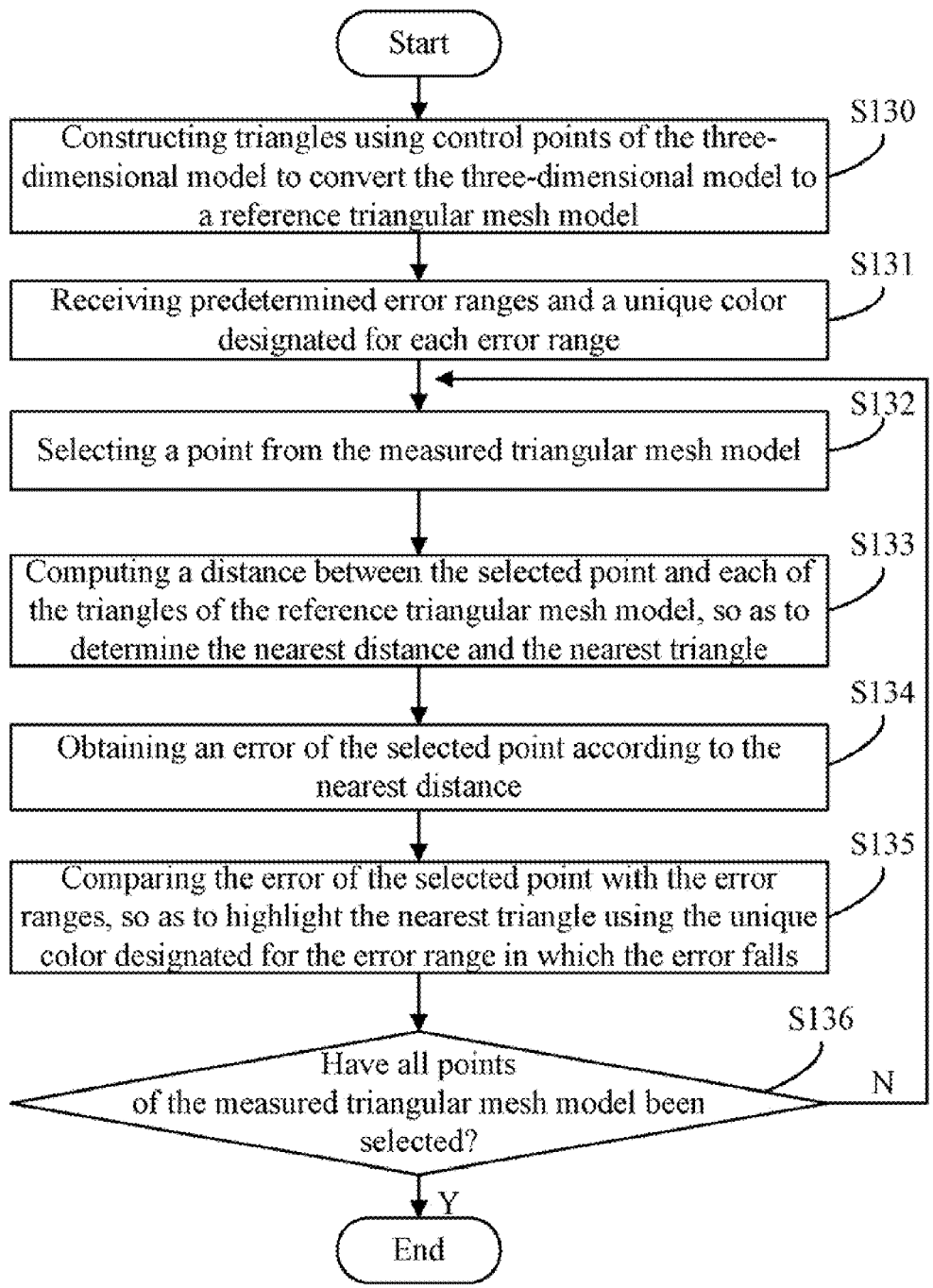
FIG. 6 details block S13 of FIG. 2.

FIG. 6 details block S13 of FIG. 2, namely comparing a measured triangular mesh model with the three-dimensional model for checking differences between the two models. Depending on the embodiment, in FIG. 6, additional blocks may be added, others removed, and the ordering of the blocks may be changed.

In block S130, the error measuring unit 10 constructs triangles by connecting each two control points of the three-dimensional model, so as to convert the three-dimensional model to a reference triangular mesh model. It may be understood that the control points are points that determine the shape of the three-dimensional model.

In block S131, the error measuring unit 10 receives a plurality of predetermined error ranges and a predetermined unique color designated for each error range. As an example, the error ranges may be −0.05 millimeters (mm)~0 mm, 0 mm~0.05 mm, 0.05 mm~0.1 mm, and 0.1 mm~0.15 mm. A color designated for the error range −0.05 mm 0 mm may be yellow, a color designated for the error range 0 mm~0.05 mm may be red, a color designated for the error range 0.05 mm~0.1 mm may be blue, and a color designated for the error range 0.1 mm~0.15 mm may be green, for example.

In block S132, the error measuring unit 10 selects a point, which has not been selected, from the measured triangular mesh model. The selection may be random.

In block S133, the error measuring unit 10 computes a distance between the selected point and each of the triangles of the reference triangular mesh model, so as to determine the nearest distance and the nearest triangle corresponding to the nearest distance.

In block S134, the error measuring unit 10 obtains an error of the selected point. It may be understood that the nearest distance is the error of the selected point.

In block S135, the error measuring unit 10 compares the error of the selected point with the error ranges, so as to highlight the nearest triangle using the unique color designated for the error range in which the error falls. For example, if the color designated for the error range 0 mm~0.05 mm is red and the error of the selected point is 0.01, then the nearest triangle is highlighted with the color of red.

In block S136, the error measuring unit 10 determines if all points of the measured triangular mesh model have been selected. If any one point of the measured triangular mesh model has not been selected, block S132 is repeated. Otherwise, if all points of the measured triangular mesh model have been selected, the process is completed.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-based method for measuring errors of a plurality of workpieces manufactured according to a three-dimensional model, the method being performed by execution of non-transitory computer readable program code by at least one processor of at least one computer system, the method comprising:
   (a) receiving the three-dimensional model and a point cloud of each workpiece from a storage system;
   (b) constructing triangles using the point cloud to convert each point cloud to a measured triangular mesh model;
   (c) aligning each measured triangular mesh model to the three-dimensional mode comprising:
      (c 1) determining an initial position of the measured triangular mesh model;
      (c2) computing an Nth virtual position of the measured triangular mesh model according to the initial position or an (N−1)th virtual position using an iterative method;
      (c3) repeating block (c2) until a predetermined iterative count has been reached;
      (c4) moving the measured triangular mesh model to the Nth virtual position;
      (c5) computing a distance between each point in the measured triangular mesh model and the three-dimensional model, so as to obtain a nearest distance and a nearest point corresponding to the nearest distance from the measured triangular mesh model; and
      (c6) moving the measured triangular mesh model for the central point therein going to the position where the nearest point is;
   (d) comparing each measured triangular mesh model with the three-dimensional model to check for differences between the two models, so as to obtain errors of each workpiece;
   (e) generating one or more analysis reports according to the errors of each workpiece; and
   (f) outputting the one or more analysis reports to a display screen.

2. The computer-based method as described in claim 1, wherein the point cloud of each workpiece is generated by a scanner.

3. The computer-based method as described in claim 1, wherein block (b) comprises:
   (b1) determining a minimum cuboid encasing the point cloud, creating a regular grid of the cuboid to generate a plurality of grid cubes, and establishing a relationship between each point of the point cloud and one of the grid cubes;
   (b2) acquiring a first point, which has not constructed any triangle with other points, from the point cloud;
   (b3) obtaining a first group of grid cubes surrounding the first point, and selecting a second point from the first group of grid cubes;
   (b4) computing a midpoint between the first point and the second point, and obtaining a second group of grid cubes surrounding the midpoint, and select a third point from the second group of grid cubes;
   (b5) constructing a triangle by connecting the first point, the second point, and the third point; and
   (b6) repeating blocks from (b2) to (b5) until all points of the point cloud have been selected.

4. The computer-based method as described in claim 1, wherein the iterative method is the quasi-Newton method.

5. The computer-based method as described in claim 1, wherein block (d) comprises:
   (d1) constructing triangles by connecting each two control points of the three-dimensional model to convert the three-dimensional model to a reference triangular mesh model;
   (d2) receiving a plurality of predetermined error ranges and a predetermined unique color designated for each error range;
   (d3) selecting a point, which has not been selected, from the measured triangular mesh model;
   (d4) computing a distance between the selected point and each of the triangles of the reference triangular mesh model, so as to determine the nearest distance and the nearest triangle corresponding to the nearest distance;
   (d5) obtaining an error of the selected point according to the nearest distance;
   (d6) comparing the error of the selected point with the error ranges so as to highlight the nearest triangle using the unique color designated for the error range in which the error falls; and
   (d7) repeating blocks from (d3) to (d6) until all points of the measured triangular mesh model have been selected.

6. The computer-based method as described in claim 1, wherein the analysis reports comprise at least one of an analysis report that analyzes errors of the entirety of each single workpiece, an analysis report that analyzes errors of a portion of each single workpiece, an analysis report that analyzes errors of the entirety of all workpieces, and an analysis report that analyzes errors of the same portion of all workpieces.

7. A non-transitory computer-readable medium having stored thereon instructions that, when executed by a computer, cause the computer to perform method for measuring errors of a plurality of workpieces manufactured according to a three-dimensional model, the method comprising:
   (a) receiving the three-dimensional model and a point cloud of each workpiece;
   (b) constructing triangles using the point cloud to convert each point cloud to a measured triangular mesh model;
   (c) aligning each measured triangular mesh model to the three-dimensional model comprising:
      (c1) determining an initial position of the measured triangular mesh model;
      (c2) computing an Nth virtual position of the measured triangular mesh model according to the initial position or an (N−1)th virtual position using an iterative method;
      (c3) repeating block (c2) until a predetermined iterative count has been reached;
      (c4) moving the measured triangular mesh model to the Nth virtual position;
      (c5) computing a distance between each point in the measured triangular mesh model and the three-dimensional model, so as to obtain a nearest distance and a nearest point corresponding to the nearest distance from the measured triangular mesh model; and
      (c6) moving the measured triangular mesh model for the central point therein going to the position where the nearest point is;

(d) comparing each measured triangular mesh model with the three-dimensional model to check for differences between the two models so as to obtain errors of each workpiece;

(e) generating one or more analysis reports according to the errors of each workpiece; and (f) outputting the one or more analysis reports.

8. The computer-readable medium as described in claim 7, wherein the point cloud of each workpiece is generated by a scanner.

9. The computer-readable medium as described in claim 7, wherein block (b) comprises:

(b1) determining a minimum cuboid encasing the point cloud, creating a regular grid of the cuboid to generate a plurality of grid cubes, and establishing a relationship between each point of the point cloud and one of the grid cubes;

(b2) acquiring a first point, which has not constructed any triangle with other points, from the point cloud;

(b3) obtaining a first group of grid cubes surrounding the first point, and selecting a second point from the first group of grid cubes;

(b4) computing a midpoint between the first point and the second point, and obtaining a second group of grid cubes surrounding the midpoint, and select a third point from the second group of grid cubes;

(b5) constructing a triangle by connecting the first point, the second point, and the third point; and (b6) repeating blocks from (b2) to (b5) until all points of the point cloud have been selected.

10. The computer-readable medium as described in claim 7, wherein the iterative method is the quasi-Newton method.

11. The computer-readable medium as described in claim 7, wherein block (d) comprises:

(d1) constructing triangles by connecting each two control points of the three-dimensional model to convert the three-dimensional model to a reference triangular mesh model;

(d2) receiving a plurality of predetermined error ranges and a predetermined unique color designated for each error range;

(d3) selecting a point, which has not ever been selected, from the measured triangular mesh model;

(d4) computing a distance between the selected point and each of the triangles of the reference triangular mesh model, so as to determine the nearest distance and the nearest triangle corresponding to the nearest distance;

(d5) regarding the nearest distance as an error of the selected point;

(d6) comparing the error of the selected point with the error ranges so as to highlight the nearest triangle using the unique color designated for the error range in which the error falls; and (d7) repeating blocks from (d3) to (d6) until all points of the measured triangular mesh model have been selected.

12. The computer-readable medium as described in claim 7, wherein the analysis reports comprise at least one of an analysis report that analyzes errors of the entirety of each single workpiece, an analysis report that analyzes errors of a portion of each single workpiece, an analysis report that analyzes errors of the entirety of all workpieces, and an analysis report that analyzes errors of the same portion of all workpieces.

* * * * *